US011170595B2

(12) United States Patent
Xi et al.

(10) Patent No.: US 11,170,595 B2
(45) Date of Patent: Nov. 9, 2021

(54) SYSTEM AND METHOD FOR ACCESS CONTROL

(71) Applicant: Hong Kong R&D Centre for Logistics and Supply Chain Management Enabling Technologies Limited, Pok Fu Lam (HK)

(72) Inventors: Jing Tian Xi, Pok Fu Lam (HK); Chin Chiu Chung, Pok Fu Lam (HK); Chi Hung Tong, Pok Fu Lam (HK); Kwong Yeung Simon Wong, Pok Fu Lam (HK)

(73) Assignee: Hong Kong R&D Centre for Logistics and Supply Chain Management Enabling Technologies Limited, Pok Fu Lam (HK)

( * ) Notice: Subject to any disclaimer, the term of this patent is extended or adjusted under 35 U.S.C. 154(b) by 0 days.

(21) Appl. No.: 16/493,592

(22) PCT Filed: Mar. 15, 2017

(86) PCT No.: PCT/CN2017/076756
§ 371 (c)(1),
(2) Date: Sep. 12, 2019

(87) PCT Pub. No.: WO2018/165897
PCT Pub. Date: Sep. 20, 2018

(65) Prior Publication Data
US 2020/0005574 A1 Jan. 2, 2020

(51) Int. Cl.
*G07C 9/28* (2020.01)
*G06K 7/10* (2006.01)
(Continued)

(52) U.S. Cl.
CPC ..... *G07C 9/00904* (2013.01); *G06K 7/10356* (2013.01); *G07C 9/28* (2020.01); *H01Q 1/2216* (2013.01); *H01Q 21/062* (2013.01)

(58) Field of Classification Search
CPC ............ G06K 7/0008; G06K 19/0723; G06K 19/07749; G06K 7/10366; H04B 5/0062; H04B 5/02
See application file for complete search history.

(56) References Cited

U.S. PATENT DOCUMENTS 6,150,948 A * 11/2000 Watkins ............... G06K 7/0008
340/693.3
7,295,114 B1 * 11/2007 Drzaic .................. A62B 99/00
235/385
(Continued)

FOREIGN PATENT DOCUMENTS

| CN | 1725250 | 1/2006 |
|----|---------|--------|
| CN | 202650173 | 1/2013 |
| CN | 106470331 | 3/2017 |

*Primary Examiner* — Brian E Miller
(74) *Attorney, Agent, or Firm* — Renner, Kenner, Greive, Bobak, Taylor & Weber (57) ABSTRACT

An access control system comprising a first detector, a second detector, and a processor. The first detector is operable to detect presence of a subject in proximity of the access control system. The second detector operable to detect an object identifier associated with an object carried by the subject in proximity of the access control system. The processor is operably connected with the first detector and the second detector. The processor is operable to receive, from the first detector, a first signal indicative of the detection of the presence of the subject, and receive, from the second detector, a second signal containing the detected object identifier. During operation, the processor is arranged to determine that an access event has occurred when it receives both the first signal and the second signal.

22 Claims, 4 Drawing Sheets

(51) Int. Cl.
*H01Q 21/06* (2006.01)
*G07C 9/00* (2020.01)
*H01Q 1/22* (2006.01)

(56) References Cited

U.S. PATENT DOCUMENTS

| | | | | |
|---|---|---|---|---|
| 7,504,949 | B1* | 3/2009 | Rouaix | G06Q 10/06 340/572.1 |
| 7,982,601 | B2* | 7/2011 | Corrado | G06K 19/0728 340/539.22 |
| 8,149,113 | B2* | 4/2012 | Diem | H04W 84/12 340/539.13 |
| 9,449,295 | B2* | 9/2016 | Russell | G06K 19/07758 |
| 9,483,717 | B2* | 11/2016 | Murrah | G06Q 10/0833 |
| 9,717,352 | B2* | 8/2017 | Molewyk | A47B 81/00 |
| 9,811,955 | B2* | 11/2017 | Russell | G06Q 90/00 |
| 9,830,484 | B1* | 11/2017 | Zerlina | G06K 7/10366 |
| 9,847,007 | B2* | 12/2017 | Logan | G08B 25/08 |
| 9,883,332 | B2* | 1/2018 | Hansen | G16H 40/67 |
| 10,544,899 | B2* | 1/2020 | Hakins | F16P 3/145 |
| 2004/0201539 | A1* | 10/2004 | Yewen | H01Q 1/2216 343/867 |
| 2004/0212493 | A1* | 10/2004 | Stilp | A01K 11/006 340/531 |
| 2007/0279189 | A1* | 12/2007 | Park | G06K 7/0008 340/10.1 |
| 2011/0145053 | A1* | 6/2011 | Hashim-Waris | G07C 9/00904 705/14.35 |
| 2011/0227748 | A1 | 9/2011 | Schaible et al. | |
| 2012/0147798 | A1* | 6/2012 | Miller, II | G06K 7/10188 370/310 |
| 2013/0278390 | A1* | 10/2013 | Cristache | G06K 7/10366 340/10.1 |
| 2013/0314210 | A1* | 11/2013 | Schoner | G08B 13/2485 340/8.1 |
| 2013/0335200 | A1* | 12/2013 | Jonely | G06K 7/10207 340/10.5 |
| 2014/0035726 | A1* | 2/2014 | Schoner | H04W 4/029 340/8.1 |
| 2014/0375430 | A1* | 12/2014 | Cristache | G01S 5/0289 340/10.1 |
| 2016/0302384 | A1* | 10/2016 | Hill | E05F 15/76 |
| 2018/0211073 | A1* | 7/2018 | Kwan | G06K 7/10366 |
| 2018/0357845 | A1* | 12/2018 | Berg | G07C 9/00571 |

* cited by examiner

SYSTEM AND METHOD FOR ACCESS CONTROL

TECHNICAL FIELD

The present invention relates to a system for access control and particularly, although not exclusively, to a RFID-based access control system.

BACKGROUND

Access control systems and methods are generally used to monitor or control access to resources, areas, and properties such as buildings, rooms, hospitals, factories, exhibitions, etc.

A known type of access control system is a door access control system that includes one detector arranged at the doorway to monitor entrance and exit of relevant persons. Exemplary applications of such system includes anti-wandering at elderly centers and hospitals, attendance recording for companies and factories, and personnel tracking at conferences and exhibitions.

These known systems, while can permit controlled access, do exhibit drawbacks. These include a high false alarm rate, high energy consumption, high operation cost, etc.

SUMMARY OF THE INVENTION

In accordance with a first aspect of the present invention, there is provided an access control system, comprising: a first detector operable to detect presence of a subject in proximity of the access control system; a second detector operable to detect an object identifier associated with an object carried by the subject in proximity of the access control system; and a processor operably connected with the first detector and the second detector, the processor being operable to receive, from the first detector, a first signal indicative of the detection of the presence of the subject; and receive, from the second detector, a second signal containing the detected object identifier; wherein, during operation, the processor is arranged to determine that an access event has occurred when it receives both the first signal and the second signal. Preferably, the subject is a human being or an animal.

In one embodiment of the first aspect, the first detector is a motion sensor arranged to detect motion of a subject in proximity of the access control system. The motion sensor may comprise a photocell sensor, a passive infrared sensor, or a magnetic sensor. Other motion sensors based on optical signals, sound waves, or EM waves may also be used.

In one embodiment of the first aspect, the first detector comprises a transceiver arranged to emit a signal and to detect the signal reflected from a subject, wherein the detection of the signal is indicative of the presence of a subject in proximity of the access control system.

In one embodiment of the first aspect, the second detector is an electromagnetic field detector.

In a preferred embodiment of the first aspect, the second detector comprises an RFID reader and one or more antennas while the object (carried by the subject) is an RFID tag. In one example, the RFID tag is mounted to or embedded in a wearable device or garment worn by the subject.

In one embodiment of the first aspect, the object identifier is an electronic product code associated with the RFID tag. Each RFID tag has a unique electronic product code. Preferably, the RFID tag is a passive RFID tag. Preferably, the RFID tag is a UHF RFID tag, i.e., operating in ultra-high frequency, readable by the RFID reader.

In one embodiment of the first aspect, the one or more antennas is a directional antenna. Preferably, the directional antenna comprises one or more Yagi-Uda antennas. Other directional antenna such as parabolic antennas, helical antennas or phased arrays may also be used. Preferably, the directional antenna is adjustable to modify a detection range of the RFID reader.

In one embodiment of the first aspect, a detection range of the first detector at least partly overlaps with a detection range of the second detector, but is smaller than the detection range and/or direction of the second detector.

In one embodiment of the first aspect, the access control system further comprises an alarm, operably connected to the processor, for indicating the occurrence of the access event. The alarm may be one or more of: an audible alarm, a visual alarm, or a tactile alarm. The alarm may comprise one or more of a buzzer, a speaker, a light indicator (e.g., one or more LEDs), a vibration-motor, etc.

In a preferred embodiment of the first aspect, the access control system further comprises a memory storing a mapping table containing one or more entries each including an object identifier associated with an object carried by a subject and a corresponding subject identifier of the subject. In one example, the mapping table is loaded into the memory by the operator, optionally through a communication module, and can be overwritten. In one embodiment, the memory may be part of the processor, or it may be at least partly implemented in the processor. In another example, the memory may also be separate from but operably connected with the processor.

In one embodiment of the first aspect, the processor is further arranged to determine a corresponding subject identifier associated with the detected object identifier based on the one or more entries in the mapping table. In one example, if the processor detects an access event but fails to find a corresponding subject identifier, this indicates that the access event is performed by a subject unknown and possibly irrelevant to the access control system.

In a preferred embodiment of the first aspect, the access control system further comprises an alarm, operably connected to the processor, for indicating the occurrence of the access event. Preferably, the alarm is actuated only when the processor determines, successfully, a corresponding subject identifier associated with the detected object identifier and that an access event has occurred. In other words, the alarm may not be provided if the processor determines that the access event has occurred but cannot determine a corresponding subject identifier associated with the detected object identifier (i.e., when the access event is performed by a subject unknown to the system).

In a preferred embodiment of the first aspect, the access control system further comprises a communication module operably connected with the processor. When the processor determines, successfully, a corresponding subject identifier associated with the detected object identifier and that an access event has occurred, the communication module is arranged to transmit the corresponding subject identifier to one or more predetermined external electronic devices. In one embodiment of the first aspect, the communication module is further arranged to transmit a time at which the alarm is actuated to the one or more predetermined external electronic devices. The external electronic devices may be a mobile phone, a computer, or other information processing system, which may be operated by an operator of the access control system.

In one embodiment of the first aspect, the communication module is a wireless communication module. In one example, the wireless communication module is a Wi-Fi module. However, in other examples, the wireless communication module may be a ZigBee module, a Bluetooth module, a NFC module, etc.

In one embodiment of the first aspect, the access control system further comprises one or more power sources arranged to power operation of the first detector, the second detector, and the processor. Preferably, the one or more power sources also power the alarm, the memory, and/or the communication module. The one or more power sources may be an AC mains, or a DC power source such as a battery pack, with relevant power circuits.

In one embodiment of the first aspect, the access control system further comprises a housing for containing or mounting the first detector, the second detector, and the processor. The housing may further contain or be mounted with the alarm, the memory, and/or the communication module. The housing may be made of plastic and is preferably waterproof.

In one embodiment of the first aspect, the access control system further comprises a stand for supporting the housing on a surface.

In accordance with a second aspect of the present invention, there is provided an access control method, comprising: detecting, using a first detector, a presence of a subject in proximity of an access control system; detecting, using a second detector, an object identifier associated with an object carried by the subject in proximity of the access control system; receiving, at the processor operably connected with the first detector and the second detector, a first signal indicative of the detection of the presence of the subject and a second signal containing the detected object identifier; and determining that an access event has occurred when both the first signal and the second signal are received by the processor. Preferably, the access control method is implemented using the access control system in accordance with the first aspect of the present invention.

In one embodiment of the second aspect, the detection step performed using the first detector comprises emitting a signal from the first detector; and detecting, at the first detector, the signal reflected from a subject, the detection of the signal being indicative of the presence of the subject in proximity of the access control system.

In one embodiment of the second aspect, the access control method further comprises actuating an alarm upon the processor detecting that an access event has occurred.

In one embodiment of the second aspect, the access control method further comprises determining, using the processor, a corresponding subject identifier associated with the detected object identifier based on mapping table containing one or more entries each including an object identifier associated with an object carried by a subject and a corresponding subject identifier of the subject. The mapping table is preferably stored in a memory operably connected with the processor.

In one embodiment of the second aspect, the alarm is actuated only when the processor is operable to determine a corresponding subject identifier associated with the detected object identifier and that an access event has occurred.

In one embodiment of the second aspect, the access control method further comprises transmitting, using a communication module operably connected with the processor, the corresponding subject identifier to one or more predetermined external electronic devices.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1A:
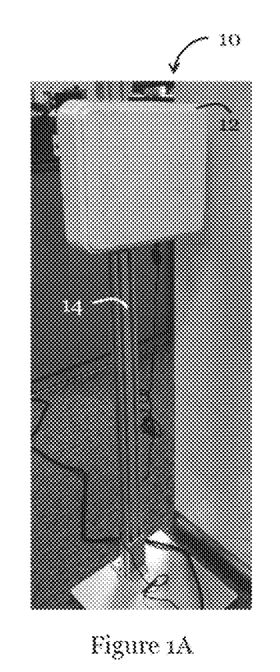
FIG. 1A is a picture of an access control system in accordance with one embodiment of the present invention.

FIG. 1A shows an access control system 10 in accordance with one embodiment of the present invention. The access control system 10 in the present invention is preferably a stand-alone, plug-and-play system 10. In the present embodiment, the system 10 includes a housing 12 mounted on a stand 14. The housing 12 is preferably water-proof. The stand 14 supports the system 10, in particular the housing 12, on the floor. One or more power cables may be connected with the system 10 for providing power to the system. One or more data communication interfaces, preferably wireless, may be arranged in the system for communicating data to and from the system 10. Alternatively or additionally, one or more data cables may be connected the system 10 for communicating data to and from the system 10.

Figure 1B:
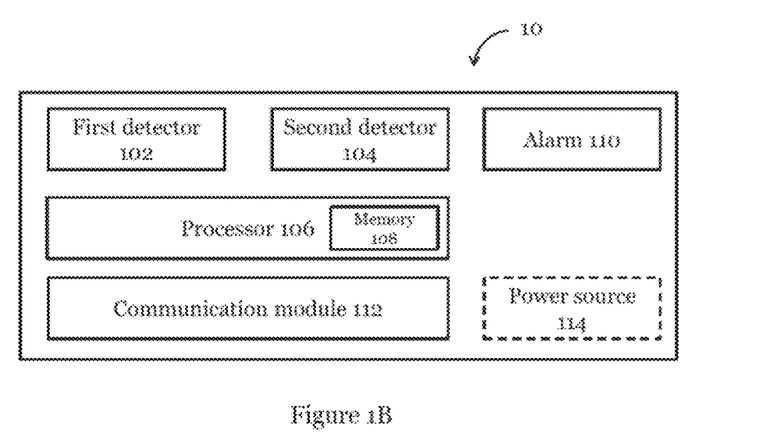
FIG. 1B is a functional block diagram of the access control system in FIG. 1A.

FIG. 1B show a functional block diagram of the basic components of the access control system 10 in FIG. 1A. As shown, the system 10 includes a first detector 102 and a second detector 104 each operably connected with a processor 106 through one or more data and/or power buses (not shown). The first detector 102 is arranged to detect presence of a subject (e.g., human subject) in proximity of the access control system 10. The second detector 104 is operable to detect an object identifier associated with an object carried by the subject in proximity of the access control system 10. During operation, the processor 106 is operable to receive, from the first detector 102, a first signal indicative of the detection of the presence of the subject, and, from the second detector 104, a second signal containing a detected object identifier. The processor 106 is arranged to determine that an access event has occurred when it receives both the first signal and the second signal from the two detectors 102, 104. In the present embodiment, the subject is a human being. However, in other embodiments, it may be an animal, or any other movable objects.

In one embodiment, the first detector 102 is a motion sensor arranged to detect motion of a subject in proximity of the access control system 10. The motion sensor 102 may be motion sensors that operate based on optical signals, sound waves, or EM waves. In a preferred embodiment, the motion sensor 102 may be a photocell sensor, a passive infrared sensor, or a magnetic sensor. In another embodiment, the first detector 102 may include a transmitter and a receiver, or alternatively, a transceiver. The transceiver may be arranged to emit a signal and to detect the signal reflected from a subject. The detection of signal by the transceiver is indicative of the presence of a subject in proximity of the access control system 10. The transceiver may determine the presence of a subject in proximity of the access control system by comparing a time difference between transmission and receipt of the signal with a predetermined duration. Alternatively or additionally, the transceiver may determine the presence of a subject in proximity of the access control system 10 by comparing an amplitude of the signal received with a predetermined amplitude threshold.

The second detector 104 may be an electromagnetic field detector or an optical detector operable to detect an identifier associated with an object. In a preferred embodiment, the second detector 104 comprises an RFID reader and one or more antennas. The RFID reader and antenna(s) may be arranged to detect an RFID tag (carried by the subject) within the detection range. In one example, the RFID tag may be mounted to or embedded in a wearable device or garment (wristband, vests, trousers, badge, etc.) worn or to be worn by the subject. In one embodiment, the object identifier is an electronic product code associated with and unique for each individual RFID tag. The RFID tag is preferably a passive RFID tag. In one embodiment, the RFID tag is a UHF RFID tag, i.e., operating in ultra-high frequency, readable by the RFID reader. The antenna is preferably a directional antenna, but can also be omni-directional. The directional antenna(s) may be one or more Yagi-Uda antennas, parabolic antennas, helical antennas, and phased arrays. The directional antenna(s) is preferably adjustable to modify a detection direction and range of the RFID reader.

The processor 106 in the present embodiment may be a CPU, an MCU, a Raspberry Pi controller, etc., operable to control operations of the system 10. In a preferred embodiment, the access control system 10 also includes a memory 108. In FIG. 1B, the memory 108 is shown as part of the processor 106. However, in some other embodiments, the memory 108 may only be partly implemented in the processor 106, or it can be a module separated from but operably connected with the processor 106. In one example, the memory 108 may include a volatile memory unit (such as RAM), a non-volatile unit (such as ROM, EPROM, EEPROM and flash memory) or both. The memory 108 may be used for storing a mapping table containing one or more entries of an object identifier associated with an object carried by a subject and a corresponding subject identifier of the subject. It should be noted that each entry need not be in a one-to-one correspondence, i.e., one object identifier to one subject identifier. In some cases, each subject identifier may be associated with two or more object identifiers. The mapping table may be pre-loaded into the memory 108 by an operator of the system 10. The mapping table can be overwritten for update. Additionally, the memory 108 may be used to store results determined by the processor 106, e.g., for subsequent transmission.

The access control system 10 may also include an alarm 110. The alarm no may be operably connected with a processor 106 through one or more data and/or power buses (not shown). In one embodiment, the alarm no may be used to indicate the occurrence of the access event as determined by the processor 106. In one embodiment, the alarm no may be an audible alarm, a visual alarm, a tactile alarm, a combination of two or all of these alarms. A visual alarm may include lighting up of one or more LEDs of a particular colour or colour sequence, flashing of one or more LEDs, or lighting up of a screen. An audible alarm may include playing a sound, message, tone, beep, etc., which can be continuous or intermittent. A tactile alarm may include a continuous or intermittent vibration that can be detected, seen, or felt. In some embodiments, the alarm no may comprise one or more of a buzzer, a speaker, a light indicator (e.g., one or more LEDs), a vibration-motor, etc. In a preferred embodiment, the alarm no is actuated only when the processor 106 determines, successfully, a corresponding subject identifier associated with the detected object identifier (i.e., can be found in the mapping table in the memory 108) and that an access event has occurred. In other words, the alarm may not be provided if the processor 106 determines that the access event has occurred but cannot determine a corresponding subject identifier associated with the detected object identifier (i.e., when the access event is performed by a subject unknown to the system 10).

In one embodiment, the access control system 10 may also include a communication module 112. The communication module 112 is operably connected with a processor 106 through one or more data and/or power buses (not shown). The communication nodule 112 is preferably a wireless communication module. It may be a Wi-Fi module, but can also be a ZigBee module, a Bluetooth module, a NFC module, etc. When the processor 106 determines, successfully, a corresponding subject identifier associated with the detected object identifier and that an access event has occurred, the communication module 112 may transmit the corresponding subject identifier to one or more predetermined external electronic devices (not shown). In one embodiment of the first aspect, the communication module 112 is further arranged to transmit a time at which the alarm is actuated to the one or more predetermined external electronic devices. In one example, the external electronic devices may be a mobile phone, a computer, or other information processing system, which may be operated by an operator of the access control system 10. The communication module 112 may contain the address or link for sending information only to these specific devices.

One or more power sources 114 may be coupled with, and preferably integrated in the system 10 through one or more power buses (not shown). The power source may power the operation of different components in the system 10. In one example, the powers source 114 maybe the AC-mains with relevant power circuits. In another example, the powers source 114 may be a DC power source such as a battery pack or battery cells, connected with relevant power circuits.

Figure 2:
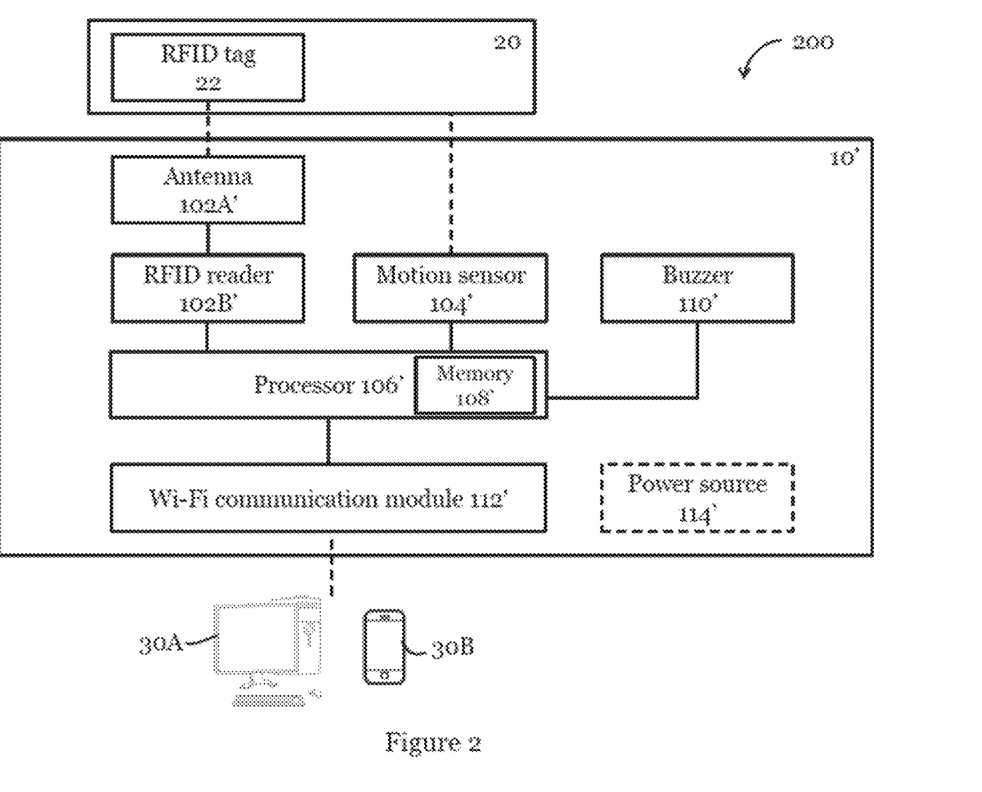
FIG. 2 is a functional block diagram of an operation environment of a specific access control system in accordance with one embodiment of the present invention.

FIG. 2 is a functional block diagram of an operation environment 200 of a specific access control system 10' in one embodiment of the present invention. In the present embodiment, the system 10' includes a motion detector 104' operating as the first detector, and a RFID reader 102B' and antenna 102A' operating as the second detector. Also, the alarm is a buzzer 110' and the communication module is a Wi-Fi module 112'. Details of the system 10 described with respect to FIGS. 1A and 1B are applicable to the system 10' in the present embodiment.

As shown in FIG. 2, the operation environment 200 further includes an object 20, for example, a garment, clothing, badge, band, etc., incorporated with one or more RFID tags 22 for communication with the system 10'. The object 20 is preferably carried by a subject. Each RFID tag 22 provides a unique electronic product code that can be used as an object identifier. The memory 108' of the system 10' is preferably loaded with a mapping table containing entries of an object identifier associated with an object carried by a subject and a corresponding subject identifier of the subject. In other words, the association between the subject and the object carried by the subject is known to the system 10'.

In the present embodiment, the operation environment 200 also includes an external electronic device, in the form of a computer 30A or a mobile phone 30B, arranged to communicate with the access control system 10', e.g., via the Wi-Fi communication module 112'. The external electronic device 30A, 30B is preferably controlled by an operator managing access of a resource, area, or property. The external electronic device 30A, 30B may store data communicated from the system 10". In one example, the operator may modify entries of the mapping table in the memory 108' through the communication module 112' using the external electronic device 30A, 30B.

In operation, when the RFID reader 102B' and antenna 102A' receives a signal from an RFID tag 22, it generates and transmits a signal to the processor 106'. In this embodiment, preferably, the RFID reader 102B' reads the unique electronic product code of the detected tag 22, and includes it in the signal to the processor 106'. At the same time, when the motion sensor 104' detects motion of a subject, it generates and transmits a signal to the processor 106'. The processor 106', upon receiving both signals from the motion sensor 104' and from the RFID reader 102B' and antenna 102A', determines that an access event has occurred, i.e., a subject has passed a boundary zone monitored by the system 10'. In one embodiment, the processor 106', upon determining that an access event has occurred, actuates the buzzer 110' to provide an alarm. However, in another embodiment, the processor 106', upon determining that an access event has occurred, further analyses the electronic product code received to determine whether it should actuate an alarm 110'.

In a preferred embodiment, the processor 106' compares the unique electronic product code received with entries in the mapping table in the memory 108'. If the processor 106' can successfully locate the unique electronic product code in the table, it actuates the buzzer 110' to provide an alarm. In one embodiment, the processor 106', upon successfully locating the unique electronic product code in the table, may further obtain the corresponding subject identifier based on the entries in the table. The processor 106' may then transmit the subject identifier corresponding to the detected electronic product code to the wireless communication module 112' for communication to one or more of the external electronic devices 30A, 30B. In embodiments in which the alarm 110' is actuated upon successfully locating the unique electronic product code in the table, the processor 106' may transmit information related to the time of actuation or duration of the alarm 110' to the wireless communication module 112' for communication to one or more of the external electronic devices 30A, 30B.

Figure 3:
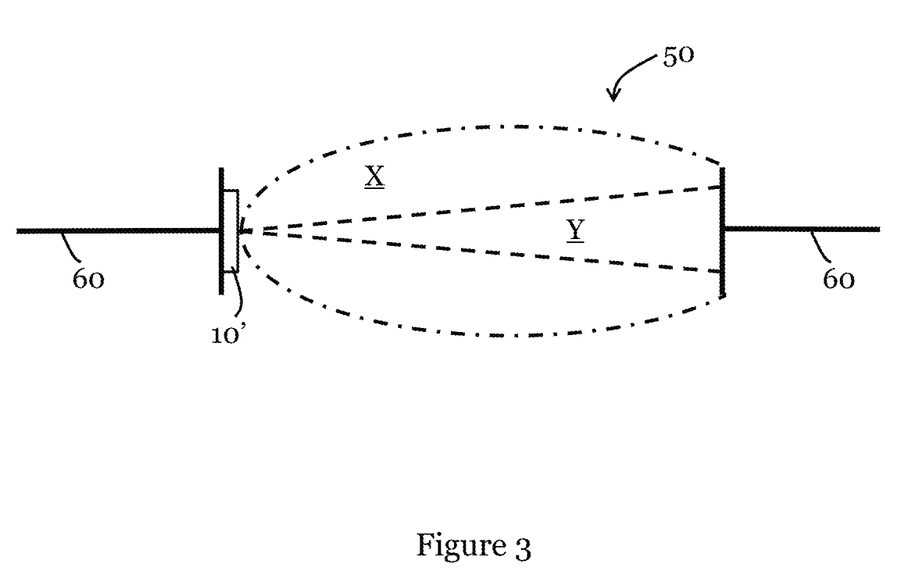
FIG. 3 is a schematic diagram showing an exemplary detection range of the detectors in the access control system of FIG. 2.

FIG. 3 is a schematic diagram showing an exemplary arrangement of the system 10' in a doorway 50 bounded by walls 60. FIG. 3 also illustrates the detection range of the detectors 102A', 102B', 104' in the access control system 10' of FIG. 2. In the present embodiment as shown, the detection range Y of the first detector, the motion sensor 104', overlaps with a detection range X of the second detector, the RFID reader 102B' and antenna 102A'. For energy efficient operation and to reduce false alarm, the detection range Y of the motion sensor 104' is preferably smaller than the detection range X of the RFID reader 102B' and antenna 102A'. In the present example, the processor 106' determines that an access event has occurred when it receives signals from both detectors 102A', 102B', 104'. In other words, the subject has to pass the detection range Y of the first detector in order for the event to be qualified as an access event. In some embodiments, as described above, the relevance of the access event is further determined through the detected object identifier and the use of a mapping table.

Figure 4:
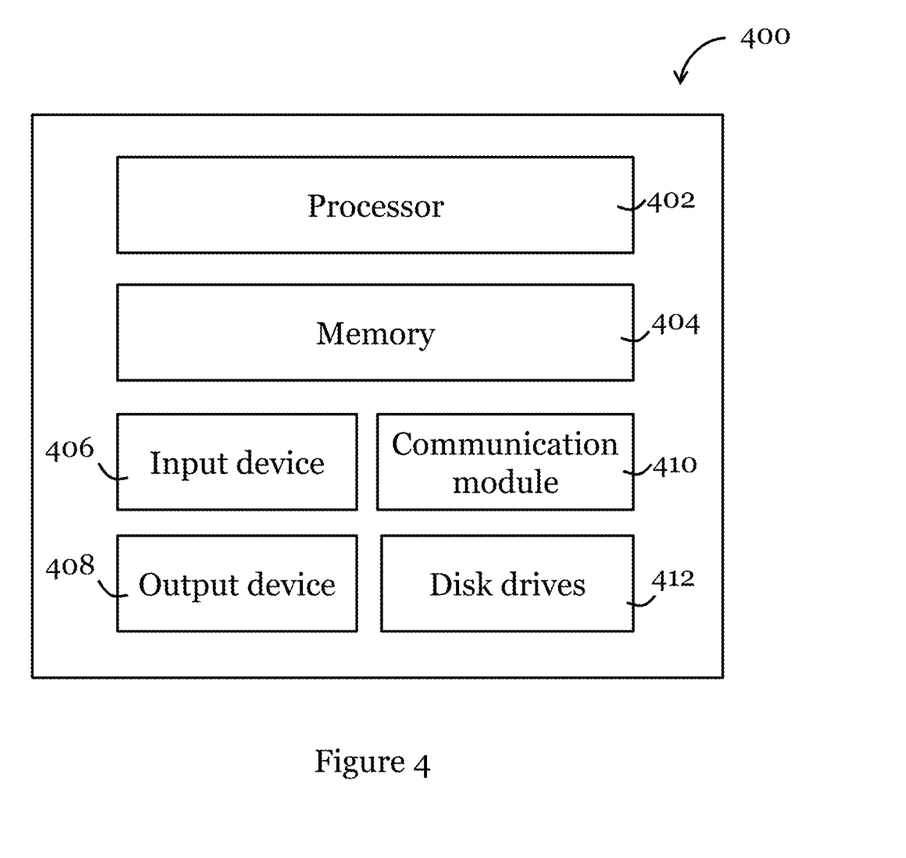
FIG. 4 is a functional block diagram of an electronic device adapted to communicate with the access control system in FIG. 2.

FIG. 4 shows a schematic diagram of an exemplary information handling system 400, such as the external electronic device 30A, 30B, for communicating with the communication module of the system 10'. The information handling system 400 may be a computer, a desktop, a laptop, a tablet, a mobile phone, or a dedicated console. The information handling system 400 may have different configurations, and it generally comprises suitable components necessary to receive, store and execute appropriate computer instructions or codes. The main components of the information handling system 400 are a processing unit 402 and a memory unit 404. The processing unit 402 is a processor such as a CPU, an MCU, etc. The memory unit 404 may include a volatile memory unit (such as RAM), a non-volatile unit (such as ROM, EPROM, EEPROM and flash memory) or both. Preferably, the information handling system 400 further includes one or more input devices 406 such as a keyboard, a mouse, a stylus, a microphone, a tactile input device (e.g., touch sensitive screen) and a video input device (e.g., camera). The information handling system 400 may further include one or more output devices 408 such as one or more displays, speakers, disk drives, and printers. The displays may be a liquid crystal display, a light emitting display or any other suitable display that may or may not be touch sensitive. The information handling system 400 may further include one or more disk drives 412 which may encompass solid state drives, hard disk drives, optical drives and/or magnetic tape drives. A suitable operating system may be installed in the information handling system 400, e.g., on the disk drive 412 or in the memory unit 404 of the information handling system 400. The memory unit 404 and the disk drive 44 may be operated by the processing unit 402. The information handling system 400 also preferably includes a communication module 410 for establishing one or more communication links (not shown) with one or more other computing devices such as a system, personal computers, terminals, wireless or handheld computing devices. The communication module 410 may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data. Preferably, the processing unit 402, the memory unit 404, and optionally the input devices 406, the output devices 408, the communication module 410 and the disk drives 44 are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the information handling system 400 shown in FIG. 4 is merely exemplary and that different systems 400 may have different configurations and still be applicable for operating the method/model of the present invention.

The above embodiments of the present invention provide an access control system that can determine not only a trespassing event, but also the identity of subject passing a restricted area. The use of two detectors, one motion detector and one identifier detector, in some embodiments effectively eliminate false positives and false negatives in detection of access events. The all-in-one, plug-and-play design in some embodiments facilitates easy installation of the system. Also, the utilization of passive UHF RFID technology in some embodiments can effectively reduce the maintenance cost of the system. Each subject, in some embodiments, may carry more than one identifier, for improved detection accuracy. Overall, access control systems of the above embodiments are compact, easy to manufacture, and they can operate effectively and efficiently.

It should be appreciated that in some other embodiments, the access control system 10 may be deployed in a distributed manner, instead of an all-in-one, plug-and-play manner. For example, at least part of the second detector may be arranged outside, or even separately from, the housing 12. In one example, additional antenna(s) may be installed on top of the door or on the ground, rather than inside the housing 12.

It will be appreciated that where the methods and systems of the present invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An access control system, comprising:
a first detector operable to detect presence of a subject in proximity of the access control system;
a second detector operable to detect an object identifier associated with an object carried by the subject in proximity of the access control system;
a memory storing a mapping table containing one or more entries each including an object identifier associated with an object carried by a subject and a corresponding subject identifier of the subject;
a processor operably connected with the first detector and the second detector and operable to
receive, from the first detector, a first signal indicative of the detection of the presence of the subject,
receive, from the second detector, a second signal containing the detected object identifier,
determine that an access event has occurred when it receives both the first signal and the second signal, and
determine a corresponding subject identifier associated with the detected object identifier based on the one or more entries in the mapping table;
an alarm, operably connected to the processor, for indicating the occurrence of an access event, the alarm being actuated only when the processor determines both
(i) a corresponding subject identifier associated with the detected object identifier based on the one or more entries in the mapping table, and
(ii) that an access event has occurred; and
a housing containing or mounting the first detector, the second detector, the memory, the processor, and the alarm, wherein the access control system is a stand-alone, plug-and-play system.

2. The access control system of claim 1, wherein the first detector is a motion sensor arranged to detect motion of a subject in proximity of the access control system.

3. The access control system of claim 2, wherein the motion sensor comprises a photocell sensor, a passive infrared sensor, or a magnetic sensor.

4. The access control system of claim 1, wherein the first detector comprises a transceiver arranged to emit a signal and to detect the signal reflected from a subject, wherein the detection of the signal is indicative of the presence of a subject in proximity of the access control system.

5. The access control system of claim 1, wherein the second detector is an electromagnetic field detector.

6. The access control system of claim 1, wherein the second detector comprises an RFID reader and one or more antennas; and the object is an RFID tag.

7. The access control system of claim 6, wherein the object identifier is an electronic product code associated with the RFID tag.

8. The access control system of claim 6, wherein the RFID tag is a passive RFID tag.

9. The access control system of claim 6, wherein the RFID tag is a UHF RFID tag readable by the RFID reader.

10. The access control system of claim 6, wherein the one or more antennas comprises a directional antenna.

11. The access control system of claim 10, wherein the directional antenna comprises one or more Yagi-Uda antennas.

12. The access control system of claim 1, wherein a detection range of the first detector is smaller than a detection range of the second detector.

13. The access control system of claim 1, wherein the alarm comprises one or more of: a buzzer, a speaker, and a light indicator.

14. The access control system of claim 1, further comprising:
a communication module operably connected with the processor;
wherein when the processor determines
a corresponding subject identifier associated with the detected object identifier based on the one or more entries in the mapping table; and
that an access event has occurred,
the communication module is arranged to transmit the corresponding subject identifier to one or more predetermined external electronic devices.

15. The access control system of claim 14, wherein the communication module is further arranged to transmit a time at which the alarm is actuated to the one or more predetermined external electronic devices.

16. The access control system of claim 14, wherein the communication module is a wireless communication module.

17. The access control system of claim 16, wherein the wireless communication module is a Wi-Fi module.

18. The access control system of claim 1, further comprising:
one or more power sources arranged to power operation of the first detector, the second detector, the memory, the alarm, and the processor.

19. The access control system of claim 1, further comprising:
a stand for supporting the housing on a surface.

20. An access control method, comprising:
(a) detecting, using a first detector, a presence of a subject in proximity of an access control system;
(b) detecting, using a second detector, an object identifier associated with an object carried by the subject in proximity of the access control system;
(c) receiving, at a processor operably connected with the first detector and the second detector, a first signal indicative of the detection of the presence of the subject and a second signal containing the detected object identifier;
(d) determining that an access event has occurred when both the first signal and the second signal are received by the processor;
(e) determining, using the processor, a corresponding subject identifier associated with the detected object identifier based on a mapping table containing one or more entries each including an object identifier associated with an object carried by a subject and a corresponding subject identifier of the subject; and
(f) actuating an alarm operably connected to the processor only when the processor determines both (i) a corresponding subject identifier associated with the detected object identifier based on the one or more entries in the mapping table, and (ii) that an access event has occurred,
wherein the access control system comprises: the first detector, the second detector, the memory, the alarm, and the processor, and a housing containing or mounting the first detector, the second detector, the memory, the alarm, and the processor; and
wherein the access control system is a stand-alone, plug-and-play system.

21. The access control method of claim 20, wherein step (a) comprising:
emitting a signal from the first detector; and
detecting, at the first detector, the signal reflected from a subject, the detection of the signal being indicative of the presence of the subject in proximity of the access control system.

22. The access control method of claim 20, further comprising:
(a) transmitting, using a communication module operably connected with the processor, the corresponding subject identifier to one or more predetermined external electronic devices.

\* \* \* \* \*